INVENTORS.
GREGORY JULIUS LISTNER
ARTHUR JAMES SAMPSON
BY

ATTORNEY

United States Patent Office 3,547,870
Patented Dec. 15, 1970

---

3,547,870
PRINTING INK FROM RANDIOPROPYLENE
Gregory Julius Listner, Kendall Park, and Arthur James Sampson, Cranbury, N.J., assignors to Johnson & Johnson, a corporation of New Jersey
Filed Aug. 1, 1967, Ser. No. 657,545
Int. Cl. C08f 45/28, 45/30, 45/44
U.S. Cl. 260—32.6                              4 Claims

ABSTRACT OF THE DISCLOSURE

This application relates to a printing ink utilizing a sterically rearranged polypropylene as a vehicle.

---

Figure 2:
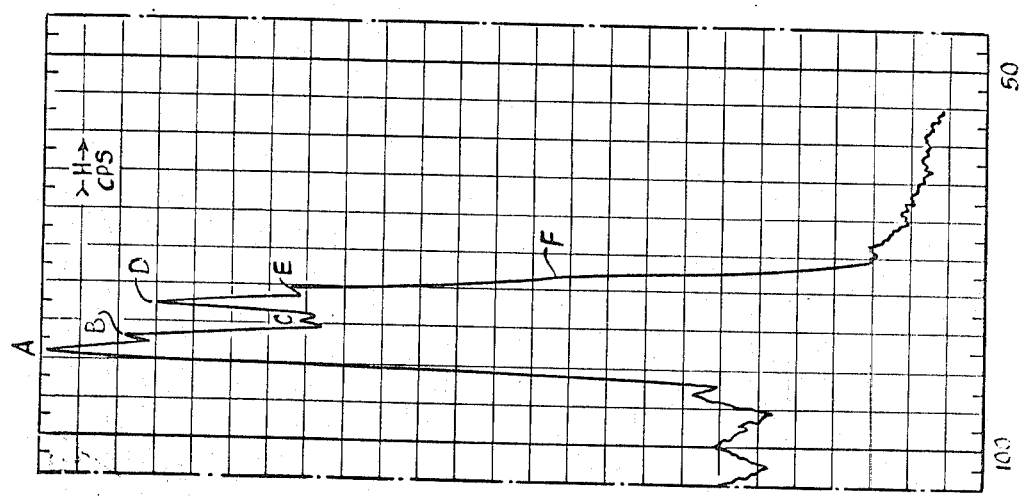

One of the main drawbacks in the present stock of available inks for use on plastic articles is the need to surface treat the plastic substrate of many plastic articles in order that the bond between the ink film and the substrate surface will be effective. Also, many of the present inks contain binders which have low film peel strength, low bond strength, high tack and a lack of flexibility. This has been especially true with respect to polyolefins and specifically with respect to polyethylene and polypropylene.

The instant invention overcomes these and other problems by providing an air dryable printing ink adapted for application to plastic articles, without surface pretreatment of such articles, which comprises a combination of randiopropylene, a solvent and a pigment.

"Randiopropylene" as used herein defines the polymer disclosed by applicant in copending application Ser. No. 629,056 which is a sterically rearranged polypropylene. More specifically it is a linear, head-to-tail stereoblock polymer of polypropylene where the macromolecules of such block polymers are characterized by possessing helical isotactic as well as randiotactic steric configurations.

Utilizing the term "configuration" as defining those arrangements of atoms which can not be altered except by breaking and reforming primary chemical bonds, it is essential, as will be seen, that the terms isotactic, syndiotactic and heterotactic configurations are also defined.

With the polypropylene polymer chain depicted in the fully extended planar zigzag configuration, if all the methyl groups lie above (or below) the plane of the main chain, it is termed isotactic, i.e.,

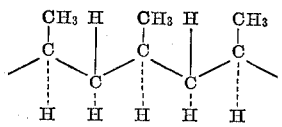

If all the methyl groups lie alternately above and below the plane, or vice versa, the configuration is syndiotactic, i.e.,

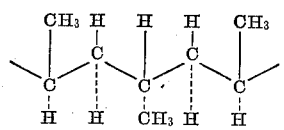

whereas, if the methyl groups are disposed such that two consecutive methyl groups are up (or down), and the next two consecutive methyl groups are down (or up), the configuration is termed heterotactic, ie.,

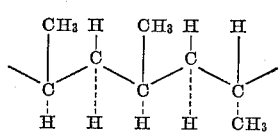

The term "randiotactic" which characterizes the configuration of the sterically rearranged or modified blocks or segments of the randiopropylene polymer utilized in the present invention, is defined as a macromolecular combination of short length isotactic, syndiotactic and heterotactic polypropylene which is completely soluble in diethyl ether. The existence of the polymer of this invention is determined by the diethyl ether solubility exhibited by the polymer as a whole. Based upon statistics, essentially pure randiotactic polypropylene is hereby defined as having a configuration with an average combination of about 25% isotactic, about 25% syndiotactic and about 50% heterotactic polymer; however, as a practical matter these tactic constituents of the randiotactic segments are present within general ranges such that the heterotactic segment(s) constitutes from about 40% to about 60% of the whole, and the isotactic segment(s) and syndiotactic segment(s) each constitute from about 20% to about 30% of the whole. These randiotactic blocks are substantially randomly positioned along the polymer chains of the randiopropylene polymer and are linked to helical isotactic blocks or segments of the polymer.

The existence of the randiotactic-isotactic randiopropylene polymer is also established by the NMR "fingerprint" reflected by the polypropylene isomers of this invention.

Figure 1:
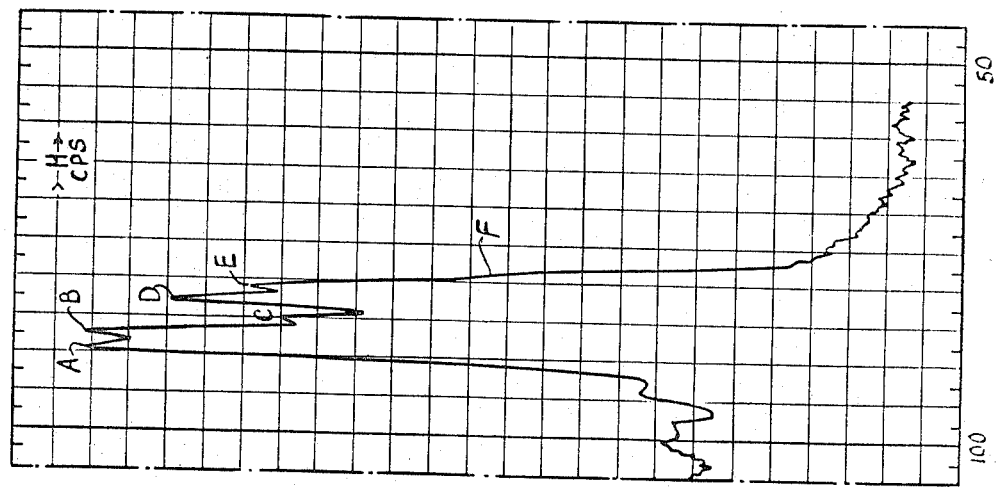

With specific reference to FIGS. 1 and 2, which report NMR analysis of certain randiopropylene isomers disclosed in copending application Ser. No. 629,056, the analysis was performed utilizing a Varian Associates HA–100, 100 megacycle NMR Spectrometer at a range of 80–90 cycles per second.

The NMR spectra given for both randiopropylene isomers exhibit the same peaks even though the isomer tested and reported via FIG. 1 has a corrected diethyl ether solubility of about 50%, and the isomer of FIG. 2 has a diethyl ether solubility of about 75%. The existence of doublets at 89 and 83 cps. (points A and D respectively) report isotactic placement, while doublets at 85 and 79 cps. (points C and F respectively) report syndiotactic placement and doublets at 87 and 81 cps. (points B and E respectively) report heterotactic placement. The area given by the doublets at B and E is always greater by a factor of about two than the area given by the doublets at C and F. The NMR "fingerprint" characterizing the presence of randiopropylene is thus established.

The randiopropylene polymer forming the essential component of the printing ink of this invention is that which is characterized by at least about a 40% conversion of the isotactic polypropylene to randiotactic. Randiopropylene defining about 40% randiotactic blocks and about 60% helical isotactic blocks or segments in a macromolecule, exhibits a density of about 0.895, a diethyl ether solubility of at least about 5%, a weight average molecular weight of at least about 65,000 a tack temperature of about 275° F. and a helical isotactic content as determined in infrared of about 60%. Additionally, NMR analysis reports a 40% randiotactic content in the macromolecules of this particular stereoarranged isotactic polypropylene polymer. Since this does define the minimum percent of steric rearrangement of the polypropylene isomer utilized in this invention, as used hereafter "randiopropylene" shall refer to sterically rearranged polypropylene having at least about 40% randiotactic and no more than about 60% isotactic morphology.

It is well known to those skilled in the art that in polypropylene the amount of isotactic triads are given by doublets at 89 and 83 cps. while the amount of heterotactic and syndiotactic are respectively given by the doublets at 87–81 and 85–79. It is also well known to those skilled in the art that the area under the curve representing these doublets is directly proportional to the amount of isotactic, heterotactic and syndiotactic triads in the polymer. In order to determine the amount of unconverted isotactic polymer, it is only necessary to subtract from the isotactic doublet the amount of isotactic triads that are present in the stereorearranged randiopropylene. The amount of isotactic triads in the randiopropylene can be calculated by using either the amount of syndiotactic triads or one-half the amount of heterotactic triads. Thus, a polymer that has been 40% converted would show 70% of the area between 89 and 79 cps. represented by the doublets shown at 89 and 83 cps., 20% of the area represented by the doublets at 87–81 cps. and 10% of the area represented by the doublets at 85–79 cps. To calculate the amount of isotactic polypropylene that has not been stereorearranged the area of the syndiotactic doublet (10%) or one-half the area of the heterotactic doublet (½ × 20%) is subtracted from the area of the isotactic doublet (70%). Thus, it is calculated that 60% of the polypropylene has not been sterically rearranged; therefore, 40% of the original isotactic polypropylene has been sterically arranged and this is the figure used as the NMR degree of conversion.

Isotactic polypropylene is highly crystalline and is largely impermeable to liquids. As with other crystalline or partly crystalline materials, solvent penetration is almost entirely through the amorphous areas. Thus since a 100% randiotactic polymer is virtually amorphous, the percent of randiotactic blocks in the stereorearranged randiopropylene utilized in this invention is very important since it must be soluble or swellable. Randiopropylene having at least about 40% randiotactic segments offers the minimum amount of randiotactic which can be utilized for reasons of solubility and because of the shrinkage exhibited by randiopropylene with larger helical isotactic contents. Since below 40%, randiopropylene exhibits a density which is too high, i.e. it crystallizes excessively. If it is highly crystalline it is difficult to dissolve in organic solvents. A solution of 40% or more randiopropylene in solvent with pigments added does not crystallize sufficiently after drying to increase in density and thus decrease in volume. Thus a printing ink film of this invention, i.e., the film comprising the composite of randiopropylene, pigments and other additives, does not decrease in volume on drying such as to produce film shrinkage to an extent that effects a separation from the substrate to which it is applied.

The weight average molecular weight of randiopropylene converted to at least 40% randiotactic is at least 65,000. This provides sufficient film strength in the printing film of the ink film on drying.

Since by the process disclosed in copending application Ser. No. 629,056, polypropylene can be sterically rearranged to provide randiotactic blocks or segments in predictable amounts, it is preferred that the randiopropylene used herein shall have at least about 75% (as determined by NMR) randiotactic configuration and about 25% helical isotactic configuration together with a density of at least about 0.87, a diethyl ether solubility of at least about 75%, a weight average molecular weight of at least about 100,000 and a tack temperature of at least about 125° F. Normally a polymer vehicle having a tack temperature of below about 125° F. will not be utilized in an ink, since the printing film of the ink would have a tacky feel and the ink would have a tendency to block unless additional pigments, tack reducers, etc., were added to remove these undesirable attributes.

Since, by the method disclosed in the aforereferenced patent application, polypropylene is sterically rearranged to tactic configurations containing minor amounts of randiotactic blocks or segments, to isomers which are virtually 100% randiotactic, and since the instant invention utilizes such stereorearranged polymers whose tactic configuration evidences from at least about 40% randiotactic to those of virtually 100% randiotactic configuration, the process for such stereorearrangement which reacts isotactic polypropylene, a free radical initiator and a bromine compound (as defined in said copending application) must utilize a free radical initiator yielding at least about 0.004% by weight of active oxygen and a bromine compound having at least about 0.4% by weight active bromine, where percent by weights are based on the total weight.

The polymer vehicle, i.e. randiopropylene, should not be of a weight average molecular weight greater than about 350,000 since above this the viscosity of the polymer is too high and very little would go into solution. Thus a satisfactory binder-to-pigment level would be unattainable unless means are provided to reduce this molecular weight to a workable range as herein defined.

The instant invention utilizes from about 3% to about 25% by weight randiopropylene, from about 20% to about 80% by weight solvent and from about 15% to about 60% by weight pigments or dyes where all percentages by weights are based on the total weight. Preferably at least from about 4% to about 15% by weight randiopropylene, from about 40% to about 60% by weight solvent and from about 30% to about 50% pigment are utilized.

The solvent utilized must be one that will dissolve randiopropylene and one which will provide a low viscosity ink solution when combined with randiopropylene and a suitable pigment or dye. The viscosity of the ink solution should be between about 100 to about 15,000 cps. when measured on a Brookfield Model RVF–100 Viscometer using a #6 spindle at 10 r.p.m. at 78° F. Below about 100 cps. the ink solution would be too fluid to apply to a substrate and it would run and have insufficient body to exhibit reasonable shelf life, unless, of course, thickeners are added. Above about 15,000 cps. the ink solution would be too viscous to work with. Additionally, the boiling point or vapor pressure of the solvent, and thus of the ink solution, must be selected to provide a balance between working time, i.e., time it takes the ink to dry on or in the applicator used to apply it to a substrate and drying time, defined as the period of time beyond which a transfer of the ink to a substrate, once the ink is exposed to air, could not be made.

Examples of such a solvent are xylene, toluene, diethyl ether, methyl ethyl ketone, methyl isobutyl ketone, diisopropyl ether, ortho dichlorobenzene, "Solvesso 150" solvent which is a mixture of aromatic solvents and is manufactured by Standard Oil of New Jersey, hydrocarbon solvents such as hexane, heptane, decane and standard commercial blends of these as derived in commercial petroleum refining.

The pigments or dyes utilized are those which are commercially available except that they must have no additives that will react with either randiopropylene, the modifier resin or the solvent utilized, and they must be capable of being dispersed in the ink system of this invention so that they do not separate out. They also must not affect the stability of the ink system. As stated, there should be from about 15% to about 60% by weight of pigments present in the system of this invention. Below about 15% by weight the resultant ink lacks sufficient depth of color and opacity and may exhibit too high a surface tack, while above 60% by weight of pigment, the printing film cohesive strength is reduced causing reduction in abrasion resistance.

Examples of such pigments are titanium dioxide in anatase or rutile forms, clays, e.g. all kaolin clays used commercially for pigmentation, carbon black, calcium carbonates, organic or inorganic coloring materials and mixtures of these.

The ink of this invention is prepared by dissolving from about 3 to about 25 parts randiopropylene in from about 20 to about 80 parts of a suitable solvent and adding from about 15 to about 60 parts of pigment.

From about 0 part to about 15 parts of other additives such as tackifiers, detackifiers, antiwebbing agents, agents to improve film strength, when necessary, and standard thickeners, etc. may be added as the need occasions.

The examples which follow illustrate this invention in greater detail. All percents are percent by weight based on the total weight unless otherwise indicated.

EXAMPLE 1

0.3% of 2,5-dimethyl-2,5-di(tertiarybutylperoxy)-hexane, 3.8% tris-(2,3-dibromopropyl) phosphate and 0.2% stearic acid are premixed in a hot water bath at a temperature of 160° F. for about ten minutes. This premix is added to 95.7% of finely divided isotactic polypropylene having a particle size that pass through a 40 mesh screen and would be contained by a 100 mesh screen, which is the commercial resin "Profac 6501" sold by Hercules Powder Company. The resultant mixture is thoroughly mixed for a period of about ten minutes or until the blend is very free flowing.

If larger amounts of total reactant additives, i.e., above 8%, are desired, the entire blend can be mixed at about 150° F. to aid absorption of the additives into the resin and to insure free-flowing properties. In that event the isotactic polypropylene resin is heated to about 150° F. separately and then combined with the preheated premixture as described above.

The reaction is carried out in a one inch 24:1 $L/D$ extruder using a chrome plated screw with a ⅔ feed section, ⅓ metering and 4.5:1 compression. A 40/100 mesh screen pack was utilized to aid extruding conditions. The temperature in the extruder was 400° F. The polymer was extruded in monofilament form, quenched in water and the monofilaments were pelletized.

EXAMPLE 2

(A) Following the procedure of Example 1, ½% of 2,5 - dimethyl-2,5-di(tertiarybutylperoxy)- hexane, ½% of tris-(2,3-dibromopropyl) phosphate and 0.3% stearic acid are premixed, extruded into monofilaments and pelletized.

(B) Again following the procedure of Example 1, 0.2% of 2,5-dimethyl-2,5-di(tertiarybutylperoxy)- hexane, 3.8% of tris-(2,3-dibromopropyl) phosphate and 0.2% stearic acid are premixed, extruded into monofilaments and pelletized.

EXAMPLE 3

(A) Ink sample I is prepared by processing 400 grams of the pelletized polymer of Example 1 on a two roll differential speed mill at about 300° F. for 15 minutes. 200 grams of this milled sample is added to 800 grams of "Solvesso 150" solvent (manufactured and sold by the Standard Oil Company of New Jersey) at room temperature and allowed to stand for about 16 hours. This mixture is stirred in a Post Mixer for 5 hours at a temperature of 140° F. 100 grams of this solution is mixed with 100 grams of PW-245 titanium dioxide pigment and ground on a three roll mill at room temperature. The resultant ink is rolled out on a 4¼″ x 4¼″ isotactic polypropylene film which is 5 mils thick; using a glue-glycerine roller, to a uniform thickness of about 2 mils. The film so coated is allowed to stand overnight to permit evaporation of the solvent.

(B) Ink sample II is prepared by dissolving 10 grams of the resin prepared via Example 2B in 90 grams of Hi Flash Naptha by heating the mixture on a hot plate at a temperature of 180° F. and then mixing on a high speed mixer. The solution is cooled to room temperature. 70 grams of this solution is mixed with 30 grams of "Titanox RA-45" titanium dioxide and the mixture is dispersed in a high speed mixer. The resultant ink is coated on a 4¼″ x 4¼″, 5 mil isotactic polypropylene film as in A above and allowed to stand overnight.

(C) Procedure B above is repeated to provide ink sample III except that the resin made via Example 2A is used.

Samples I, II and III are separately tested for abrasion resistance and film integrity in the AATCC "Accelerotor." In each case the blades are covered with polyurethane foam. In each instance the "Accelerotor" is operated for 15 seconds at 30 r.p.m. at 65° F. All of the samples I, II and III retained film integrity, i.e., the ink film applied to the polypropylene film remained essentially in tact. The ink films of samples I, II and II also exhibited excellent flexibility, and reasonable extension of the base polypropylene film caused substantially no cracking or separation of the ink film.

EXAMPLE 4

2 parts by weight of isotactic polypropylene (unstabilized) is dissolved in 98 parts by weight of xylene by heating to about 140° C. for about 5 minutes. To 100 grams of this solution, 4 grams of titanium dioxide (particulate) is added and the mixture is ground on a three roll mill at room temperature. The resultant ink is rolled out on a 4¼″ x 4¼″ isotactic polypropylene film (5 mils thick) using a glue-glycerine roller, to a uniform thickness of about 2 mils. The film so coated is allowed to stand overnight to permit evaporation of the solvent.

After evaporation of the solvent the "ink film" coating is examined and is found to have no film integrity but to be a powdery mass with substantially no adhesion to the basic polypropylene film.

EXAMPLE 5

1 gram of the randiopropylene resin prepared via the procedure of Example 2A, 2 grams of "Lucite 45" (a polyacrylic resin manufactured by Du Pont), 9 cc. of xylene and 10 cc. of orthodichlorobenzene are mixed together. This provides a polymer to polymer ratio of ⅓ randiopropylene and ⅔ polyacrylic resin. The resultant solution is clear.

To this solution 1½ grams of carbon black is added and the resultant ink solution exhibits good free flowing properties. This ink also exhibits good adhesion to polypropylene film and a film of this ink coated on a polypropylene film exhibits good abrasion resistance and flex life.

EXAMPLE 6

1 gram of the randiopropylene resin prepared via the procedure of Example 2A, 2 grams of "Versanid 940" powder (a polyamid resin manufactured by General Mills), 9 cc. of xylene and 10 cc. of orthodichlorobenzene are mixed together. This provides a polymer to polymer ratio of ⅓ randiopropylene and ⅔ polyamid. The resultant ink solution is clear.

The above is repeated and 1½ grams of carbon black is added.

Both of the above-defined ink solutions exhibit good adhesion to polypropylene film to which they are coated (and the solvent allowed to evaporate), both exhibit good flex life and abrasion resistance.

It will be apparent that many widely different embodiments of this invention may be made without departing from the spirit and scope thereof and, therefore, it is not to be limited except as indicated in the appended claims.

What is claimed is:

1. A printing ink adapted for application to plastic articles without surface pretreatment of such articles which comprises a combination of from about 3% to about 25% by weight of randiopropylene, from about 20% to about 80% by weight of a solvent for randiopropylene and from about 15% to about 60% by weight of a coloring material, said randiopropylene having a weight average molecular weight of at least about 65,000, a tack temperature of at least about 125° F., and being a sterically rearranged isotactic-randiotactic stereoblock polymer wherein the randiotactic stereoblock portions comprise an average of from about 40% to about 60% heterotactic segments, from about 20% to about 30% isotactic segments, and from about 20% to about 30% syndiotactic segments, said isotactic-randiotactic stereoblock polypropylene being further characterized by a 100 megacycle NMR spectra defined by doublets at (a) 83 and 89 cps., (b) 85 and 79 cps., and (c) 87 and 81 cps., wherein the area given by doublets (c) is about twice that area given by doublets (b).

2. The ink of claim 1 wherein said randiopropylene is characterized by at least about 40% randiotactic polymer and up to about 60% isotactic polypropylene.

3. The ink of claim 1 wherein the weight average molecular weight of said randiopropylene is at least about 65,000 and no greater than 350,000.

4. The ink of claim 1 wherein randiopropylene is present in an amount from about 4% to about 15% by weight, said solvent is present in an amount of from about 40% to about 60% by weight and said coloring material is present in an amount of from about 30% to about 50%.

References Cited
UNITED STATES PATENTS

| | | | |
|---|---|---|---|
| 2,927,047 | 3/1960 | Schülde et al. | 117—138.8 |
| 3,043,787 | 7/1962 | Bonvicini et al. | 260—4 |

OTHER REFERENCES

Natta and Danusso: Stereoregular Polymers and Stereospecific Polymerization, vol. 1, p. 215 (1967) [from an article appearing in Chemical Industria 39,275 (1957)].

MORRIS LIEBMAN, Primary Examiner

R. ZAITLEN, Assistant Examiner

U.S. Cl. X.R.

260—33.6, 94.9